No. 851,610. PATENTED APR. 23, 1907.
J. F. TINER.
WRENCH.
APPLICATION FILED APR. 5, 1906.

2 SHEETS—SHEET 1.

Witnesses
Stuart Hilder.
George M. Anderson.

Inventor
John F. Tiner
By E. W. Anderson
his Attorney

No. 851,610. PATENTED APR. 23, 1907.
J. F. TINER.
WRENCH.
APPLICATION FILED APR. 5, 1906.
2 SHEETS—SHEET 2.
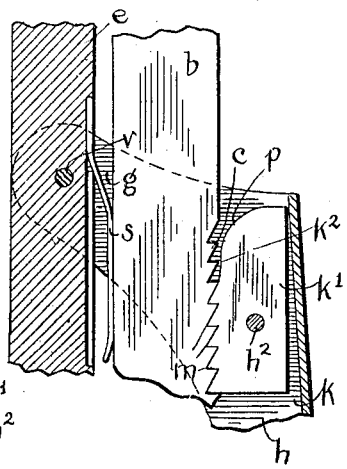
Fig.4.
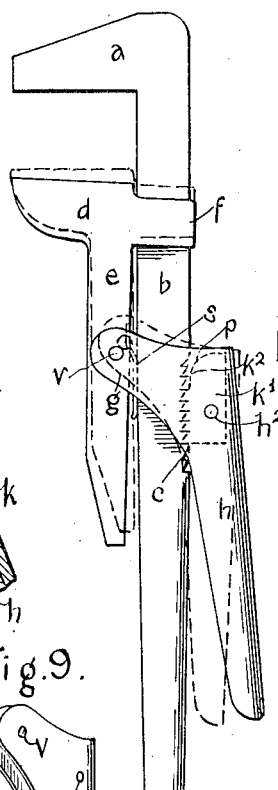
Fig.5.
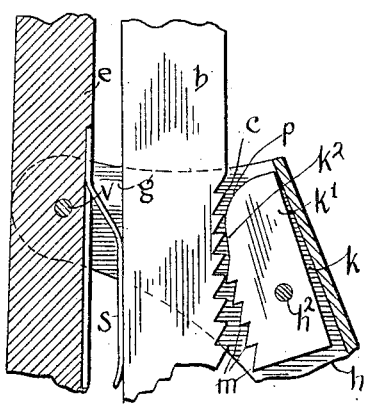
Fig.6.
Fig.7.
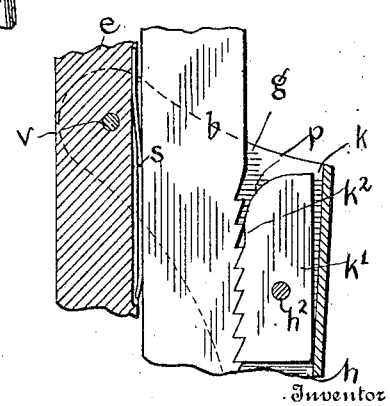
Fig.8.
Fig.9.
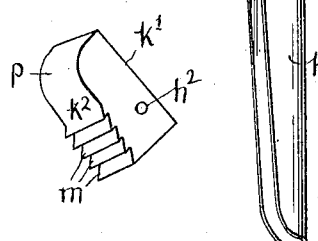
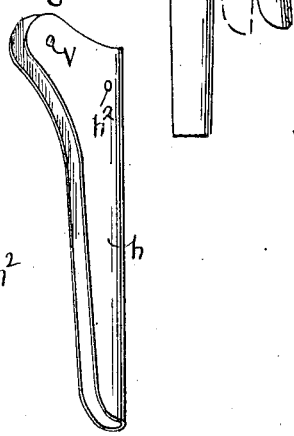
Witnesses
Stuart Hilder.
George M. Anderson.
Inventor
John F. Tiner
By E. W. Anderson
his Attorney

UNITED STATES PATENT OFFICE.

JOHN F. TINER, OF UVALDE, TEXAS.

WRENCH.

No. 851,610.     Specification of Letters Patent.     Patented April 23, 1907.

Application filed April 5, 1906. Serial No. 310,032.

*To all whom it may concern:*

Be it known that I, JOHN F. TINER, a citizen of the United States, a resident of Uvalde, in the county of Uvalde and State of Texas, have made a certain new and useful Invention in Wrenches; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 2:
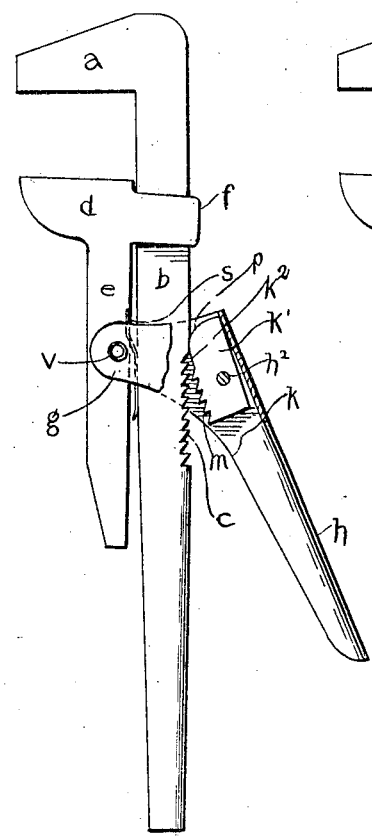
Figure 1:
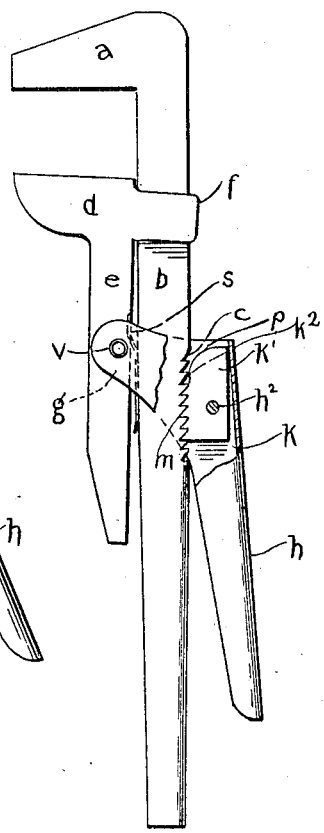
Figure 3:
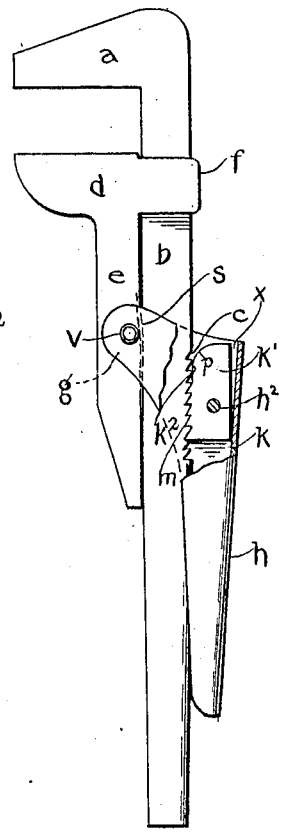

Figure 1 is a side view of the wrench, partly broken away, with the parts in normal position. Fig. 2 is a similar view with the handle lever thrown out to release the teeth of the dog from the teeth of the fixed jaw shank. Fig. 3 is a similar view with the handle lever closed toward the fixed jaw shank. Fig. 4 is a side view of the wrench, with the parts in normal position, the positions of the parts when the handle lever is closed toward the fixed jaw shank being shown in dotted lines. Fig. 5 is a detail sectional view on a larger scale, with the parts in normal position. Fig. 6 is a similar view with the handle lever thrown outward to release the teeth of the pivoted dog from the teeth of the fixed jaw shank. Fig. 7 is a similar view with the handle lever closed toward the fixed jaw shank. Fig. 8 is a detail perspective view of the dog. Fig. 9 is a similar view of the handle lever.

The invention has relation to wrenches of that type wherein the movable jaw and its operating lever are on opposite sides of the shank of the main jaw, and it consists in the novel construction and combinations of parts, as hereinafter set forth.

The object of the invention is to provide a powerful wrench of simple construction, wherein the movement for the operation of the jaws is of slight degree, partially automatic and easily effected.

In the accompanying drawings, the letter $a$, designates the main jaw, and $b$, its shank, which is straight, the jaw $a$, extending from its end at right angles. The opposite side of the shank $b$, from the jaw $a$, is provided with a series of teeth $c$, at about its middle portion. These teeth are incut, or set with their outer ends even with the plane of the side of the shank, so that the slide end of the lever of the movable jaw will readily pass over them when this jaw is being adjusted.

The movable jaw $d$, is provided with a short shank $e$, extending along the main shank, and the adjacent sides of this short shank and the main shank are smooth. The jaw $d$, extends at right angles to the short shank, parallel to the main jaw. The movable jaw is connected to the shank of the main jaw by a broad loop $f$, which is sufficiently loose to allow the movable jaw to rock a little.

The handle $h$, is recessed at its upper end at $k$, and has, at its upper end portion, within the inclosing side and back walls of such recess, a dog $k'$, provided with several teeth, usually five or six on the side next the main shank. These teeth project from the inner lateral surface $k^2$, of the dog, as indicated at $m$, said lateral surface being rounded outward to the upper end of the dog to provide a rounded extension or slide end $p$, beyond the teeth $m$. The dog is pivoted to the inclosing side walls of the handle lever intermediately of the length of the dog at $h^2$ and so that its rear wall is near the rear wall or bearing of the recess of the angle lever, but sufficiently removed therefrom to allow a little vibratory motion when the movable jaw is reciprocated with relation to the fixed jaw.

In the operation of this wrench, the action for disengagement and readjustment depends upon the conjoint operation, in connection with the fixed jaw and movable jaw shanks, of an angle lever, and a compound sliding and toothed dog pivoted to said angle lever at the obtuse angle thereof, whereby the disengagement is effected directly by the pressure of the lever on the slide end portion of the dog, in conjunction with the pressure of the rounded slide end of the dog against the fixed jaw shank, forming a new fulcrum for the handle lever and dog at the point of pressure. The readjusting reciprocatory movement is facilitated by the independent vibratory motion of the dog.

The end of the short shank of the movable jaw is pivoted at $s$ to cheek lugs $g$ of the handle lever $h$, said lugs embracing or straddling the main shank of the wrench. The pivot $v$ is so located with respect to the fulcrum pivot $h^2$ that a line joining these two points has an obtuse angle relation to the handle end of the lever $h$ of about one hundred and thirty five degrees. A spring $s$ is located between the movable jaw shank and the main or fixed jaw shank, being shown as connected to the movable jaw shank and sliding upon the fixed jaw shank. The handle $h$ will thus upon release thereof after action of the wrench jaws upon the work, be swung outward upon the fulcrum pivot $h^2$ of the dog to a slight extent, through the operation of the spring $s$, and owing to the oblique or obtuse angle relation of the work arm of the handle lever to its handle end or power arm, the pivot $v$, with the movable jaw and its shank will be drawn or retracted from the work to a slight extent, so that its engagement therewith will be released sufficiently to allow the wrench to be turned on the work for a new purchase. The dog $k'$, will during this operation remain stationary with all of its teeth engaged with the teeth of the main shank. The rear wall of the handle lever normally bears at one end portion upon the slide and fulcrum end portion of the pivoted dog, and movement of the handle lever toward the fixed jaw shank without disturbance of the adjustment of the dog is allowed for by a space marked $x$ between the rear wall of the handle lever and the dog, gradually increasing in width toward the other end of the dog. Thus at all stages of the operation of the wrench upon the work the teeth of the dog are all engaged with the teeth of the shank of the fixed jaw. When however, it is desired to adjust the movable jaw for larger or smaller work, the handle lever is brought outward from normal position when the dog acts as a rigid part of the lever and rocks therewith upon its rounded slide end $p$, which is always in engagement with the fixed jaw shank forming a new fulcrum upon which the handle lever turns to effect a disengagement of the teeth of the dog from the teeth of the main shank, when the movable jaw and the handle lever are free for longitudinal movement to effect the desired adjustment, the dog $k'$, sliding along the inset line of teeth $m$, upon its rounded slide end. The teeth of the dog are thus disengaged from the teeth of the main shank only when adjustment for larger or smaller work is needed.

The handle lever may be formed entirely of sheet metal, as shown, being bent into the required form and open at the inner side from top to bottom.

The wrench can be instantly adjusted, has but little wear of the parts, takes a perfect grip with a slight adjustment of the parts, slackens the grip automatically to take a new hold, will turn in either direction, and will not crush or deface the finest work.

Having thus described my invention, what I claim as new and desire to secure by Letters Patent is:—

1. A wrench consisting of a main jaw having a shank provided with a series of teeth on the opposite side thereof from the jaw, a movable jaw having a short shank, a spring between the movable and fixed jaw shanks, an obtuse-angle handle lever having a pivotal connection with the end of the movable jaw shank, a lever dog having a series of teeth adapted to engage the teeth of the main jaw shank, said dog being loosely pivoted to the handle lever at the angle thereof, and having a rounded slide and fulcrum end above its toothed portion and pivot, substantially as specified.

2. A wrench, consisting of a main jaw having a shank provided with a series of teeth on the opposite side thereof from the jaw, a movable jaw having a short shank, and carrying a spring between the movable and fixed jaw shanks, an obtuse-angle handle-lever having a pivotal connection with the end of the movable jaw shank, a lever dog having a series of teeth normally in engagement with the teeth of the fixed jaw shank, said dog having a fulcrum pivot connection with the handle lever at the obtuse angle thereof and upon which fulcrum pivot the lever normally works, and a rounded slide and fulcrum end above its toothed portion and fulcrum pivot, the handle lever being adapted when thrown outward to engage the slide end portion of the dog and rock the same into contact at its rounded end with the fixed jaw shank, whereby a new fulcrum is taken at such point of contact to effect disengagement of the teeth of the dog from the teeth of the fixed jaw shank.

In testimony whereof I affix my signature, in presence of two witnesses.

JOHN F. TINER.

Witnesses:
JOHN O. MEUSEBACH,
H. C. LINDSAY.